United States Patent
Krishnan et al.

(10) Patent No.: US 11,906,981 B2
(45) Date of Patent: Feb. 20, 2024

(54) SYSTEM AND METHOD FOR UPDATING VIRTUAL WORKSITE

(71) Applicant: Caterpillar Inc., Peoria, IL (US)

(72) Inventors: Lokanath Radha Krishnan, Kolar (IN); Sivakumar ShanmugaSundaram, Chennai (IN); Sarvika Raghu, Tirupur (IN)

(73) Assignee: Caterpillar Inc., Peoria, IL (US)

( * ) Notice: Subject to any disclaimer, the term of this patent is extended or adjusted under 35 U.S.C. 154(b) by 195 days.

(21) Appl. No.: 17/650,252

(22) Filed: Feb. 8, 2022

(65) Prior Publication Data

US 2023/0251671 A1   Aug. 10, 2023

(51) Int. Cl.
G05D 1/00         (2006.01)

(52) U.S. Cl.
CPC ......... *G05D 1/0297* (2013.01); *G05D 1/0027* (2013.01); *G05D 1/0044* (2013.01); *G05D 2201/0202* (2013.01)

(58) Field of Classification Search
None
See application file for complete search history.

(56) References Cited

U.S. PATENT DOCUMENTS

| | | | |
|---|---|---|---|
| 8,253,724 | B2 | 8/2012 | Strassenburg-Kleciak et al. |
| 8,351,684 | B2 | 1/2013 | Clar et al. |
| 9,483,863 | B2 * | 11/2016 | Clar .................. G06T 17/05 |
| 2009/0202109 | A1 | 8/2009 | Clar et al. |

(Continued)

FOREIGN PATENT DOCUMENTS

| | | |
|---|---|---|
| GB | 2558255 | 3/2019 |
| JP | 2021179105 A | 11/2021 |

(Continued)

OTHER PUBLICATIONS

Jinki Moon, Youngwan Son, Shinsuk Park and Jinwook Kim, "Development of immersive augmented reality interface for construction robotic system," 2007 International Conference on Control, Automation and Systems, Seoul, 2007, pp. 1192-1197, doi: 10.1109/ICCAS.2007.4406515. (Year: 2007).*

(Continued)

*Primary Examiner* — Khoi H Tran
*Assistant Examiner* — Bryant Tang (57) ABSTRACT

A system for updating a virtual worksite includes a plurality of simulated construction machine controllers associated with a corresponding construction machine. Each simulated construction machine controller collects data indicative of an updated height map of one or more portions of the virtual worksite on which the corresponding construction machine is operating. A central controller receives the data indicative of the updated height map of the one or more portions of the virtual worksite from the plurality of simulated construction machine controllers and compares the received data with an initial data model of the virtual worksite. The central controller generates an updated data model of the virtual worksite based on the comparison and transmits the updated data model of the virtual worksite to each of the plurality of simulated construction machine controllers and/or a user interface. The user interface displays a real time streaming of data of the virtual worksite thereon.

20 Claims, 5 Drawing Sheets (56) References Cited

U.S. PATENT DOCUMENTS

| | | |
|---|---|---|
| 2011/0148856 A1 | 6/2011 | Sprock et al. |
| 2018/0137446 A1 | 5/2018 | Shike et al. |
| 2020/0388043 A1 | 12/2020 | Nemoto et al. |
| 2020/0399863 A1 | 12/2020 | Aizawa et al. |
| 2021/0012163 A1 | 1/2021 | Li et al. |
| 2021/0142557 A1* | 5/2021 | Shike .................... B64C 39/024 |

FOREIGN PATENT DOCUMENTS

| | | | |
|---|---|---|---|
| KR | 102170748 B1 * | 10/2020 | ........... B64C 39/024 |
| WO | 2018115281 A1 | 6/2018 | |

OTHER PUBLICATIONS

Written Opinion and International Search Report for Int'l. Patent Appln. No. PCT/US2022/060746, dated May 2, 2023 (12 pgs).

\* cited by examiner

SYSTEM AND METHOD FOR UPDATING VIRTUAL WORKSITE

TECHNICAL FIELD

The present disclosure relates generally to a number of construction machines operating at a virtual worksite, and more particularly, to a system and a method for updating the virtual worksite based on a movement and/or operation of the number of construction machines.

BACKGROUND

Various operations, such as material removal, material movement, and/or material distribution may have to be performed at a construction worksite before initiating a construction of structures, such as, roadways, speedways for motor vehicles, airport runways, dams, water spill ways, residential and/or commercial complexes, and the like. For example, roadways, such as concrete and asphalt surfaced roads, may be built to facilitate vehicular travel. Paved roadways generally consist of a surface course (e.g., concrete or asphalt) that is supported by a base layer and/or a subbase layer of aggregate material deposited on a subgrade of native earth material. At the beginning of a road-building operation, the subgrade is prepared through several earth-working processes that are designed to improve workability of the subgrade, redistribute subgrade materials, set a slope of the subgrade, and increase a density of the subgrade materials prior to paving. Such earth-working operations may be performed to achieve longer lasting and better performing roadways that may withstand greater loads over time and varying conditions.

In many instances, several types of construction machines may be involved in a process of preparing subgrades at various construction worksites. Such construction machines may include rotary mixers for mixing and stabilizing subgrade materials, dozers for redistributing subgrade materials, motor graders for finishing subgrade surfaces and setting its slope, and/or compactors for increasing a density of subgrade materials to improve a load bearing capability thereof. Such construction machines may be used in succession to perform a particular task having certain production goals that partially define an overall design plan or design model for the construction worksite. In another example, wherein the construction worksite includes an industrial mining worksite or a quarry, heavy construction machineries, such as, excavators, wheel loaders, dump trucks, and the like may be employed at the construction worksite. Of late, utilization of autonomous construction machines is becoming more prevalent as they offer various advantages.

Specifically, autonomous construction machines may be operated in environments unsuitable for human operators, such as, for example, at high altitudes or at sparsely populated desert regions. In addition, autonomous construction machines may be operated for longer periods of time as compared to manned construction machines, thus providing increased productivity. Further, autonomous construction machines may be operated according to precise control strategies aimed at optimizing efficiency while reducing downtime and emissions. Development of full-autonomy functionalities may require an autonomy software associated with the autonomous construction machines to be tested in a wide range of scenarios that may occur at the construction worksite.

However, it may be expensive and time consuming to test a performance of the autonomous construction machines at a real worksite. Therefore, virtual testing environments may be created to test the autonomous functionalities of the autonomous construction machines at a virtually simulated worksite environment. Specifically, for the testing of the autonomy software, multiple autonomous construction machines may have to be simulated to operate at the virtually simulated worksite environment. Such an approach may enable a responsible personnel to execute a variety of tests to ensure effective and efficient autonomous operation of the autonomous construction machines. However, the autonomy software may consume a large set of real time data from various sensors and controllers associated with the autonomous construction machines. Such large volumes of data may present challenges in visualizing a real time condition of the virtually simulated worksite environment.

Further, when an autonomous construction machine operates at the virtually simulated worksite environment, the autonomous construction machine may deform one or more sections of the virtually simulated worksite environment. For example, the deformation of the virtually simulated worksite environment may take place due to a movement of the autonomous construction machine or due to one or more operations being performed by the autonomous construction machine. Currently, there are no techniques to determine and present a real time virtual representation of the deformation caused by multiple construction machines in a single environment. Thus, a solution may be desired to visualize multiple construction machines working at the virtually simulated worksite environment to determine the deformation at the virtually simulated worksite environment for purposes of performance testing and visualization of autonomous operations.

U.S. Pat. No. 8,351,684 describes a terrain mapping system. The system has at least one sensor configured to gather a plurality of current points defining a current surface of a site and a database containing a plurality of previously gathered points defining a previous surface of the site. The system also has a controller in communication with the at least one sensor. The controller is configured to compare a height of at least one of the plurality of the current points to a height of a corresponding at least one of the plurality of previously gathered points and to determine if an update to the database is warranted based on the comparison. The controller is further configured to update the database if it is determined that an update is warranted.

SUMMARY OF THE DISCLOSURE

In one aspect of the present disclosure, a system for updating a virtual worksite is provided. A plurality of construction machines operate on one or more portions defined by the virtual worksite. The system includes a plurality of simulated construction machine controllers. Each simulated construction machine controller from the plurality of simulated construction machine controllers is associated with a corresponding construction machine from the plurality of construction machines. Each simulated construction machine controller collects data indicative of an updated height map of the one or more portions of the virtual worksite on which the corresponding construction machine is operating. The system also includes a central controller communicably coupled to each of the plurality of simulated construction machine controllers. The central controller receives the data indicative of the updated height map of the one or more portions of the virtual worksite from each of the plurality of simulated construction machine controllers. The central controller compares the updated height map of the one or more portions of the virtual worksite with an initial data model of the virtual worksite. Further, the central controller generates an updated data model of the virtual worksite based on the comparison. Furthermore, the central controller transmits, to each of the plurality of simulated construction machine controllers and/or a user interface, the updated data model of the virtual worksite. The user interface displays a real time streaming of data of the virtual worksite thereon.

In another aspect of the present disclosure, a method for updating a virtual worksite is provided. A plurality of construction machines operate on one or more portions defined by the virtual worksite. The method includes collecting, by each simulated construction machine controller from a plurality of simulated construction machine controllers, data indicative of an updated height map of the one or more portions of the virtual worksite on which a corresponding construction machine from the plurality of construction machines is operating. The method also includes receiving, by a central controller, the data indicative of the updated height map of the one or more portions of the virtual worksite from each of the plurality of machine controllers. The method further includes comparing, by the central controller, the updated height map of the one or more portions of the virtual worksite with an initial data model of the virtual worksite. The method includes generating, by the central controller, an updated data model of the virtual worksite based on the comparison. The method also includes transmitting, by the central controller to each of the plurality of machine controllers and/or a user interface, the updated data model of the virtual worksite. The user interface is configured to display a real time streaming of data of the virtual worksite thereon.

Other features and aspects of this disclosure will be apparent from the following description and the accompanying drawings.

DETAILED DESCRIPTION

Wherever possible, the same reference numbers will be used throughout the drawings to refer to the same or the like parts. Wherever possible, corresponding or similar reference numbers will be used throughout the drawings to refer to the same or corresponding parts.

Figure 1:
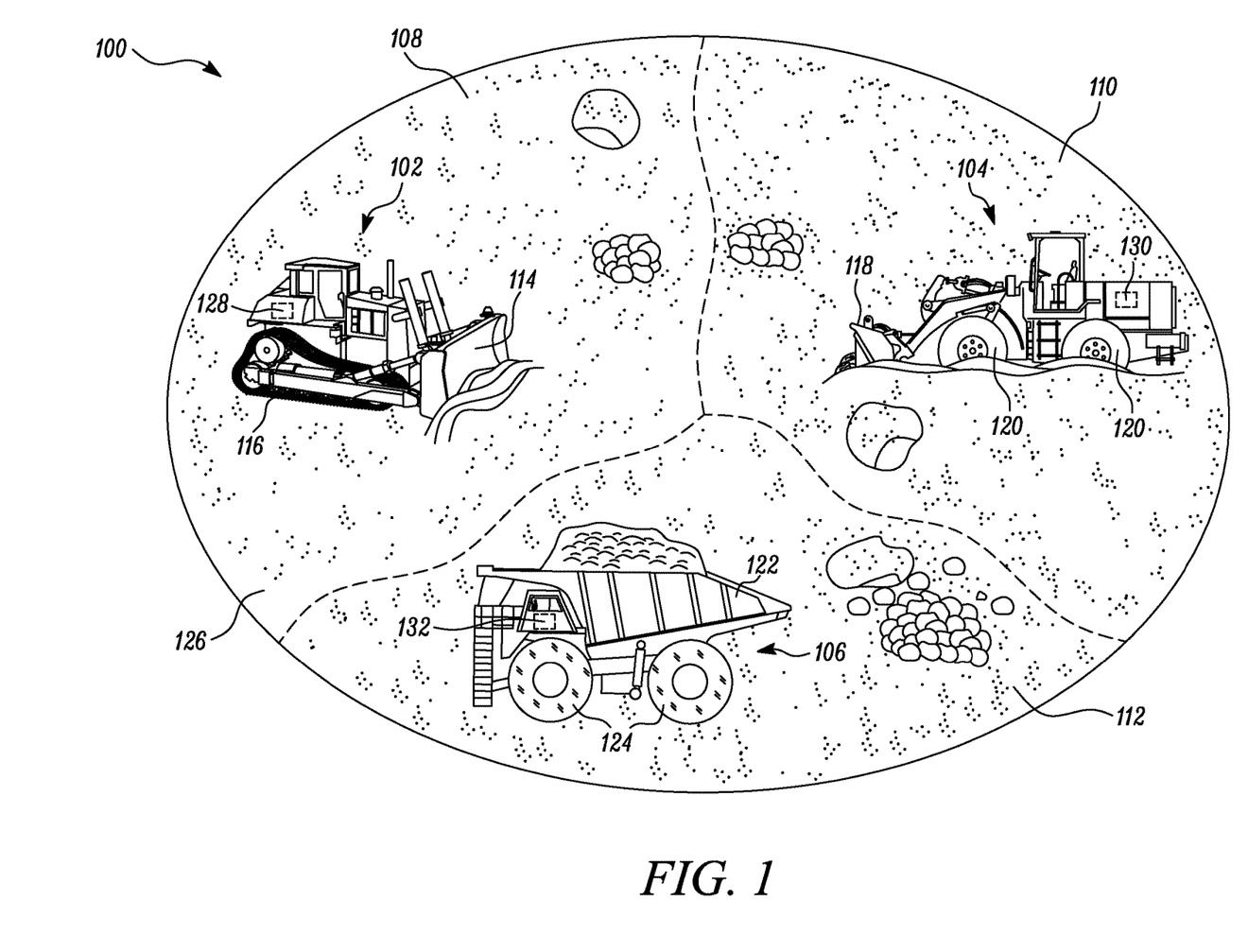
FIG. 1 illustrates a virtual worksite and a number of construction machines operating on one or more portions of the virtual worksite, according to examples of the present disclosure.

FIG. 1 illustrates a virtual worksite 100. The virtual worksite 100 may be a visual representation of an exemplary real worksite. The virtual worksite 100 may be envisioned as any construction worksite, such as, for construction of roadways, residential complexes, or commercial complexes, or any other type of a worksite on which a work or labor may be performed. In one example, the virtual worksite 100 may undergo geographic alterations due to work performed thereon by a number of construction machines 102, 104, 106. Specifically, the number of construction machines 102, 104, 106 operate on one or more portions 108, 110, 112 defined by the virtual worksite 100. The one or more portions 108, 110, 112 include a first portion 108, a second portion 110, and a third portion 112. The one or more portions 108, 110, 112 may be hereinafter interchangeably referred to as the first portion 108, the second portion 110, and the third portion 112, respectively.

It should be noted that the construction machines 102, 104, 106 are embodied as simulated construction machines herein. Each construction machine 102, 104, 106 may be made up of a number of components (such as, rigid components) and may be designed to operate a tool and/or implement coupled thereto. The number of construction machines 102, 104, 106 may include a first construction machine 102 embodied as a track type tractor, a second construction machine 104 embodied as a wheel loader, and a third construction machine 106 embodied as an off-highway truck. In some examples, the number of construction machines 102, 104, 106 may embody off-highway construction machines. The number of construction machines 102, 104, 106 may be similar or different. In some examples, the construction machines 102, 104, 106 may include autonomous or semi-autonomous construction machines.

It should be noted that the construction machine 102 may be hereinafter interchangeably referred to as the first construction machine 102. The first construction machine 102 may include an implement 114 and a pair of ground engaging members 116 embodied as tracks herein. The first construction machine 102 is illustrated as working on the first portion 108 of the virtual worksite 100.

Further, the construction machine 104 may be hereinafter interchangeably referred to as the second construction machine 104. The second construction machine 104 may include an implement 118 and two pairs of ground engaging members 120 embodied as wheels herein. The second construction machine 104 is illustrated as working on the second portion 110 of the virtual worksite 100.

Moreover, the construction machine 106 may be hereinafter interchangeably referred to as the third construction machine 106. The third construction machine 106 may include a payload carrier 122 and two pairs of ground engaging members 124 embodied as wheels herein. The third construction machine 106 is illustrated as working on the third portion 112 of the virtual worksite 100. It may be understood that the construction machines 102, 104, 106 may include additional components that have not been explained herein. For exemplary purposes, only three construction machines 102, 104, 106 are illustrated herein. However, more than three construction machines 102, 104, 106 may operate at the virtual worksite 100, as per application requirements.

The number of construction machines 102, 104, 106 may perform various tasks, such as, material-gathering, material distribution, material removal, or other geography-altering tasks at the virtual worksite 100.

The present disclosure describes techniques to test an operation of the number of construction machines 102, 104, 106 in a virtual environment. Specifically, the techniques described herein may simulate the operation of the number of construction machines 102, 104, 106 to provide a real time representation of the virtual worksite 100 as well as the number of construction machines 102, 104, 106 operating at the virtual worksite 100.

The virtual worksite 100 includes a surface 126 and one or more objects/personnel (not shown) positioned at the virtual worksite 100. The surface 126 may include, for example, soil, rocks, ore, mineral deposits, coal, precious metals, lumber, scrap, garbage, or other materials. The objects may include infrastructure, such as, conveyors, chutes, lifts, and/or other material transport means; storage, refining, and/or processing facilities; worksite headquarters or other buildings; and/or other structures or fixtures, without any limitations. The objects may also include the number of construction machines 102, 104, 106, scaffolding, tools, and/or other items that may move about the virtual worksite 100 and/or have a transitory presence at the virtual worksite 100.

For the purpose of description of the present disclosure, the number of construction machines 102, 104, 106 operate on one or more portions 108, 110, 112 of the virtual worksite 100. As the virtual worksite 100 is divided into the multiple portions 108, 110, 112 herein, each portion 108, 110, 112 of the virtual worksite 100 has an associated initial height map. The initial height map may provide information regarding an initial surface profile of the corresponding portion 108, 110, 112 of the virtual worksite 100. The initial height map corresponding to the particular portion 108, 110, 112 of the virtual worksite 100 may change periodically based on interaction of the number of construction machines 102, 104, 106 with the corresponding portions 108, 110, 112 of the virtual worksite 100.

It should be contemplated that each construction machine 102, 104, 106 may operate on more than one portion 108, 110, 112 of the virtual worksite 100. For example, each construction machine 102, 104, 106 may move over the virtual worksite 100 such as to operate on multiple portions 108, 110, 112 of the virtual worksite 100. It should be noted that more than one construction machine 102, 104, 106 may operate at one portion 108, 110, 112 of the virtual worksite 100 at a particular instance of time. For example, based on a current work plan, the first and second construction machines 102, 104 may operate at the first portion 108.

The present disclosure describes a system 300 (shown in FIG. 3) for updating the virtual worksite 100. The system 300 includes a number of simulated construction machine controllers 128, 130, 132 (shown in FIGS. 2 and 3). Each of the number of simulated construction machine controllers 128, 130, 132 is associated with a corresponding construction machine 102, 104, 106 from the number of construction machines 102, 104, 106. The first construction machine 102 includes an associated simulated construction machine controller 128. The simulated construction machine controller 128 may be hereinafter interchangeably referred to as a first simulated construction machine controller 128. The second construction machine 104 includes an associated simulated construction machine controller 130. The simulated construction machine controller 130 may be hereinafter interchangeably referred to as a second simulated construction machine controller 130. The third construction machine 106 includes an associated simulated construction machine controller 132. The simulated construction machine controller 132 may be hereinafter interchangeably referred to as a third simulated construction machine controller 132.

The simulated construction machine controllers 128, 130, 132 collect data indicative of an updated height map of the one or more portions 108, 110, 112 of the virtual worksite 100 on which the corresponding construction machines 102, 104, 106 are operating. Specifically, as the corresponding simulated construction machine controllers 128, 130, 132 control the operation of the corresponding construction machines 102, 104, 106 at the virtual worksite 100, the corresponding simulated construction machine controllers 128, 130, 132 may calculate an interaction between the construction machines 102, 104, 106 and the one or more portions 108, 110, 112 to determine changes/updates made to the initial height map at the virtual worksite 100. The updated height map may include a recent version of a height map of the portions 108, 110, 112 of the virtual worksite 100 which may have undergone deformation due to movement and/or operations performed by the corresponding construction machines 102, 104, 106. Further, the construction machines 102, 104, 106 may include one or more sensors to collect data that may allow the corresponding simulated construction machine controllers 128, 130, 132 to generate the updated height map. The sensors may calculate and record the interaction between various components of the construction machines 102, 104, 106 and the one or more portions 108, 110, 112 of the virtual worksite 100 to update the data model of the virtual worksite 100. The sensors may include, but not limited to, a position sensor, a global positioning system (GPS) module, an inertial measurement unit (IMU), an accelerometer, etc. Further, the sensors may include navigation sensors or perception sensors. The perception sensors may include sensors, such as, a digital camera or any other such sensor that provides information on perceived environment around the construction machine 102, 104, 106 in three dimension. The sensors associated with the corresponding construction machines 102, 104, 106 may be communicably coupled to the corresponding simulated construction machine controllers 128, 130, 132. It should be noted that the present disclosure is not limited by a type of the sensor. Accordingly, the sensor may include any other known in the art sensor that provides the desired functionalities.

Each of the number of simulated construction machine controllers 128, 130, 132 includes an associated memory (not shown). The memory may include a flash memory, a random-access memory (RAM), a persistent memory storage, such as, a hard-disk, a solid state drive, and the like. The memory may be used to store data such as algorithms, instructions, arithmetic operations, and the like. Such data may also be stored in an associated disk. The simulated construction machine controllers 128, 130, 132 may execute various types of digitally stored instructions, such as a software or an algorithm, retrieved from the memory, or a firmware program which may enable the corresponding simulated construction machine controllers 128, 130, 132 to perform a wide variety of operations.

Further, the memory may store information related to various operational parameters of the corresponding construction machine 102, 104, 106 as well as information related to the one or more portions 108, 110, 112 of the virtual worksite 100 on which the corresponding construction machine 102, 104, 106 is operating. In an example, the memory associated with each simulated construction machine controller 128, 130, 132 may store the initial height map of the one or more portions 108, 110, 112 of the virtual worksite 100 on which the corresponding construction machine 102, 104, 106 may operate, an initial position data for the corresponding construction machine 102, 104, 106, an initial orientation data for the corresponding construction machine 102, 104, 106, an initial navigation data for the corresponding construction machine 102, 104, 106, and an initial perception data for the corresponding construction machine 102, 104, 106. Further, the initial orientation data for the corresponding construction machine 102, 104, 106 may include a heading data, meaning, in which direction the corresponding construction machine 102, 104, 106 is currently moving. The initial orientation data may also include data corresponding to a position, an orientation, linear and/or angular velocities, linear and/or angular acceleration, and the like of one or more rigid components of the corresponding construction machines 102, 104, 106, such as, a frame of the corresponding construction machines 102, 104, 106, the implement 114, 118 of the corresponding construction machines 102, 104, the payload carrier 122 of the construction machine 106, and the like. It should be contemplated that the examples provided herein are merely exemplary and do not limit the present disclosure in any manner. The memory associated with each simulated construction machine controller 128, 130, 132 may store any other suitable parameters as well which may be well within the scope of the present disclosure.

Further, it should be noted that the updated height map of the first portion 108 of the virtual worksite 100 may be updated based on data collected by the first simulated construction machine controller 128. Additionally, the updated height map of the second portion 110 of the virtual worksite 100 may be updated based on data collected by the second simulated construction machine controller 130. Moreover, the updated height map of the third portion 112 of the virtual worksite 100 may be updated based on data collected by the third simulated construction machine controller 132. However, in some examples wherein the first and second construction machines 102, 104 both operate at the first portion 108, the first and second simulated construction machine controllers 128, 130 may receive data from the first and second construction machines 102, 104 to generate the updated height map of the first portion 108.

Figure 2:
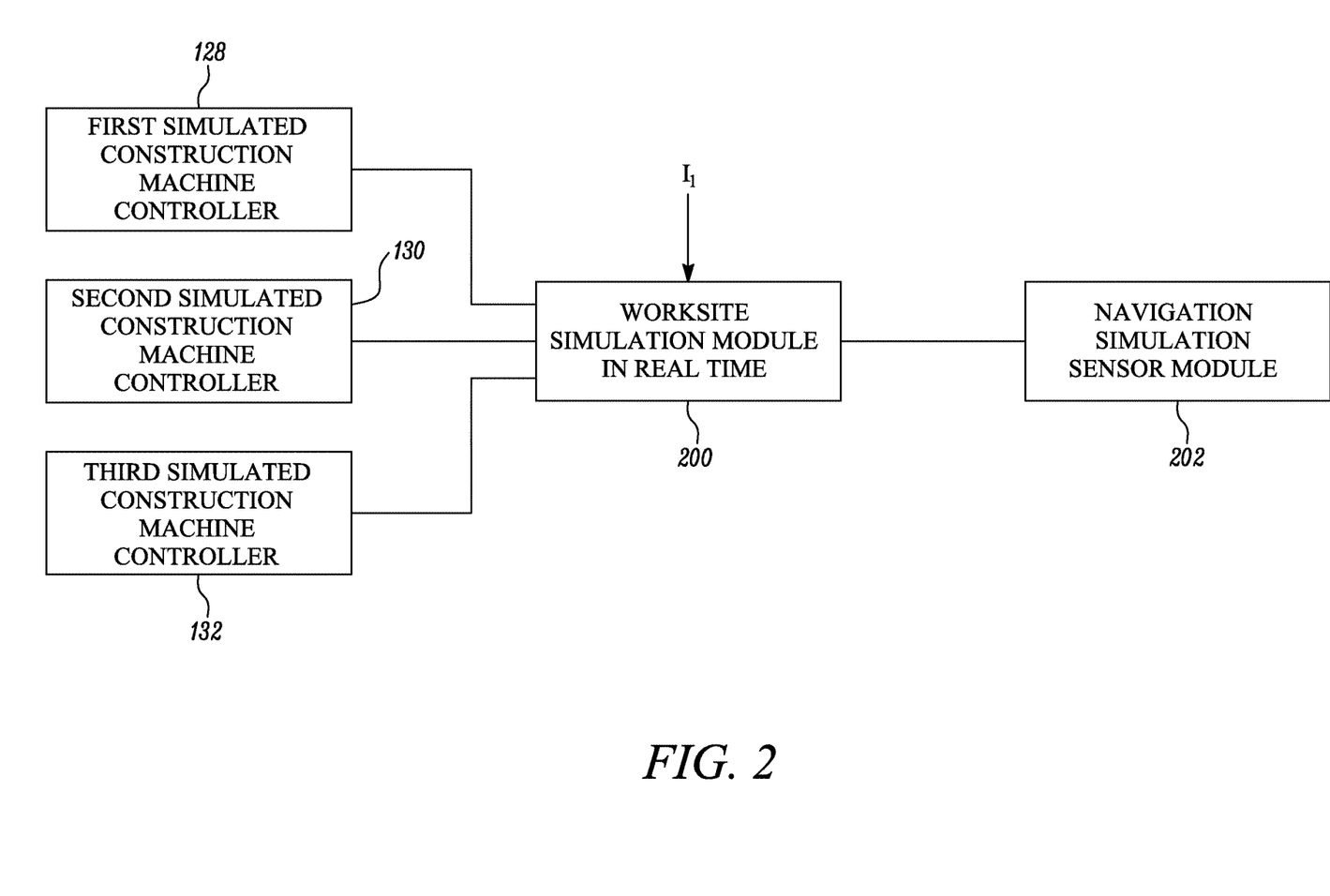
FIG. 2 is a block diagram illustrating generation of an updated height map for various portions of the virtual worksite, according to examples of the present disclosure.

FIG. 2 illustrates a block diagram for explaining the generation of the updated height map for one or more portions 108, 110, 112 of the virtual worksite 100 by the corresponding simulated construction machine controllers 128, 130, 132. As illustrated, a worksite simulation module 200 may be communicably coupled to each simulated construction machine controller 128, 130, 132. For illustration purposes, FIG. 2 shows the first simulated construction machine controller 128 associated with the first construction machine 102 (see FIG. 1) which operates at the first portion 108 (see FIG. 1) of the virtual worksite 100 (see FIG. 1), the second simulated construction machine controller 130 associated with the second construction machine 104 (see FIG. 1) which operates at the second portion 110 (see FIG. 1) of the virtual worksite 100, and the third simulated construction machine controller 132 associated with the third construction machine 132 (see FIG. 1) which operates at the third portion 112 of the virtual worksite 100.

Further, the worksite simulation module 200 receives the initial height map of the first, second, and third portions 108, 110, 112 of the virtual worksite 100 as a first input "I1". In an example, the worksite simulation module 200 may receive the first input "I1" through survey data for a test site, from the memory associated with the corresponding first, second, and third simulated construction machine controllers 128, 130, 132, from sensors associated with the corresponding first, second, and third simulated construction machine controllers 128, 130, 132, such as, GPS modules, drones, satellites, and the like.

In an example, each of the number of simulated construction machine controllers 128, 130, 132 associated with the corresponding construction machine 102, 104, 106 from the number of construction machines 102, 104, 106 may collect data indicative of one or more interaction points between one or more components of the corresponding construction machine 102, 104, 106 and the one or more portions 108, 110, 112 of the virtual worksite 100 on which the corresponding construction machine 102, 104, 106 is operating. The one or more components of the corresponding construction machine 102, 104, 106 may include for example, the implement 114, 118, the ground engaging members 116, 120, 124 or any other component that interacts with the portions 108, 110, 112 of the virtual worksite 100. In the illustrated example of FIG. 2, the worksite simulation module 200 may receive the interaction points between the one or more components of the corresponding construction machine 102, 104, 106 and the one or more portions 108, 110, 112 of the virtual worksite 100. Further, each of the number of simulated construction machine controllers 128, 130, 132 associated with the corresponding construction machine 102, 104, 106 from the number of construction machines 102, 104, 106 may use the collected data to generate the updated height map of the one or more portions 108, 110, 112 of the virtual worksite 100 on which the corresponding construction machine 102, 104, 106 is operating.

Thus, based on the initial height maps and the interaction points, the worksite simulation module 200 may generate the updated height map of the first, second, and third portions 108, 110, 112 of the virtual worksite 100. The worksite simulation module 200 may send the updated height map of the first portion 108 to the first simulated construction machine controller 128, the updated height map of the second portion 110 to the second simulated construction machine controller 130, and the updated height map of the third portion 112 to the third simulated construction machine controller 132. The worksite simulation module 200 may also send the updated height maps of the first, second, and third portions 108, 110, 112 to a navigation simulation sensor module 202. In an example, the worksite simulation module 200 may be a part of a central controller 302 of the system 300 for updating the virtual worksite 100 as depicted in FIG. 3.

Figure 3:
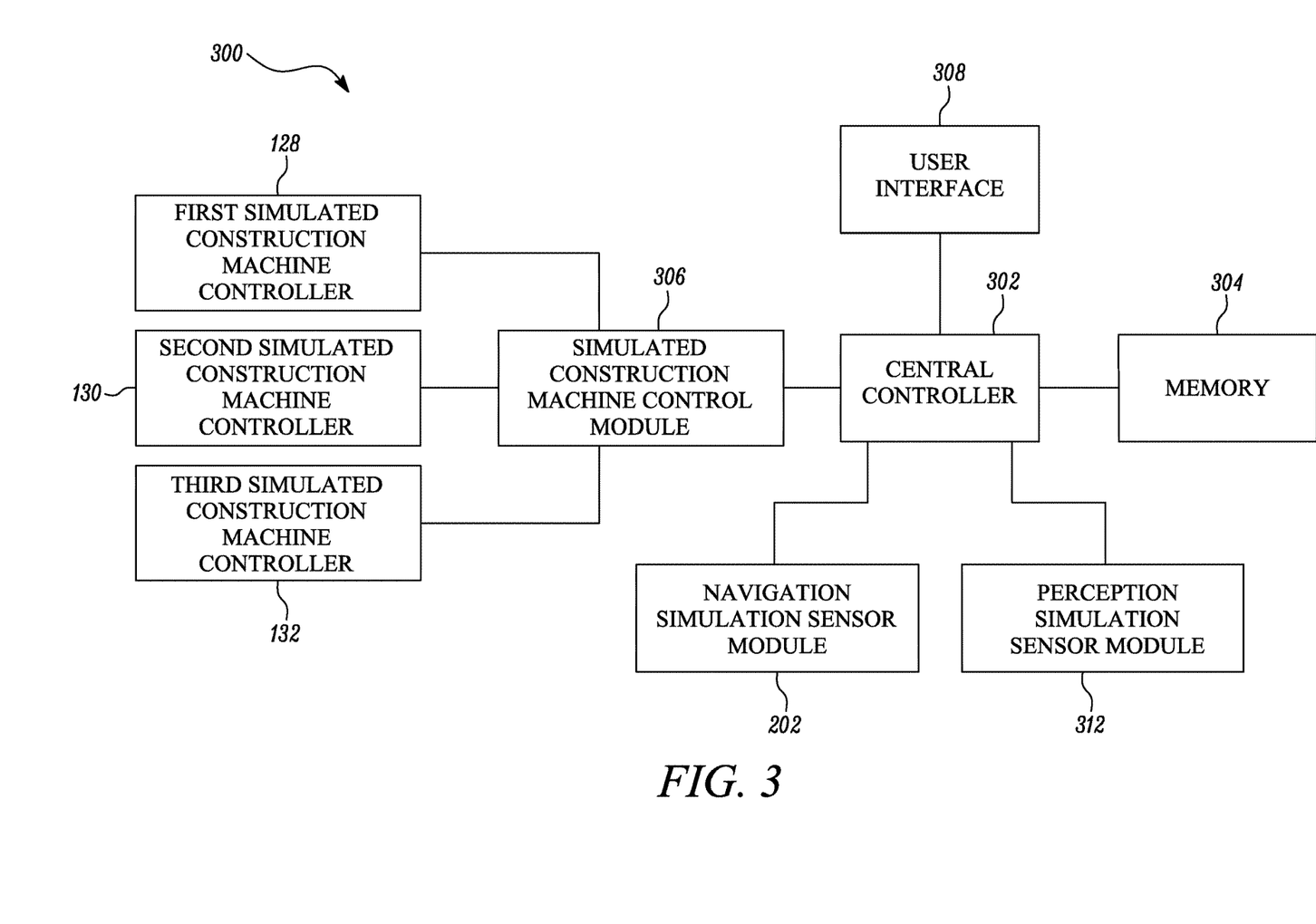
FIG. 3 illustrates a block diagram for a system for updating the virtual worksite, according to examples of the present disclosure.

Referring to FIG. 3, a block diagram of the system 300 is illustrated. The system 300 includes the number of simulated construction machine controllers 128, 130, 132. The system 300 also includes the central controller 302. The central controller 302 includes a memory 304. The memory 304 may include a flash memory, a random-access memory (RAM), a data storage device, and the like. The memory 304 may be used to store data such as algorithms, instructions, arithmetic operations, and the like. The central controller 302 may execute various types of digitally stored instructions, such as a software or an algorithm, retrieved from the memory 304, or a firmware program which may enable the central controller 302 to perform a wide variety of operations. Further, the memory 304 may store information related to various parameters of the virtual worksite 100 as well as information related to the number of construction machines 102, 104, 106.

The memory 304 of the central controller 302 may store an initial data model of the virtual worksite 100. The initial data model of the virtual worksite 100 includes an initial height map of the virtual worksite 100, the initial position data for each of the number of construction machines 102, 104, 106, the initial orientation data for each of the number of construction machines 102, 104, 106, the initial navigation data for each of the number of construction machines 102, 104, 106, or the initial perception data for each of the number of construction machines 102, 104, 106. The initial orientation data may correspond to data indicative of the initial heading direction for each construction machine 102, 104, 106. The initial orientation data may also include data corresponding to the position, the orientation, linear and/or angular velocities, linear and/or angular acceleration, and the like of one or more rigid components of the corresponding construction machines 102, 104, 106, such as, a frame of the corresponding construction machines 102, 104, 106, the implement 114, 118 of the corresponding construction machines 102, 104, the payload carrier 122 of the construction machine 106, and the like.

The central controller 302 is communicably coupled to a construction machine control module 306. As illustrated, the construction machine control module 306 is also communicably coupled to the number of simulated construction machine controllers 128, 130, 132. The construction machine control module 306 may receive various data from the number of simulated construction machine controllers 128, 130, 132, normalize the received data for further processing, and share the data with the central controller 302. In some examples, the construction machine control module 306 may receive the updated height map corresponding to each of the first, second, and third portions 108, 110, 112 from the corresponding first, second, and third simulated construction machine controllers 128, 130, 132.

The central controller 302 receives various types of data from the construction machine control module 306 corresponding to the number of construction machines 102, 104, 106 as well as the number of portions 108, 110, 112 of the virtual worksite 100 on which the corresponding construction machines 102, 104, 106 are operating. In an example, the system 300 may eliminate the construction machine control module 306, such that the central controller 302 may be communicably coupled with the first simulated construction machine controller 128, the second simulated construction machine controller 130, and the third simulated construction machine controller 132 to receive data therefrom.

The central controller 302 may normalize the received data from the construction machine control module 306 such that all the received data follows a similar coordinate system or a similar convention. For example, axial coordinates may be generated differently for each construction machine 102, 104, 106 based on respective directional coordinates and placement of the number of construction machines 102, 104, 106. The central controller 302 may apply appropriate transformations on the received data to represent all the received data in a single coordinate system and/or convention, or may perform coordinate transformations for further processing.

The central controller 302 may receive the data indicative of the updated height map of the one or more portions 108, 110, 112 of the virtual worksite 100 from each of the number of simulated construction machine controllers 128, 130, 132. Specifically, the central controller 302 may receive data indicative of the updated height map of the one or more portions 108, 110, 112 of the virtual worksite 100 via the construction machine control module 306.

Further, the central controller 302 compares the updated height map of the one or more portions 108, 110, 112 of the virtual worksite 100 with the initial data model of the virtual worksite 100. In the illustrated example, the central controller 302 compares the updated height map of the first portion 108, the second portion 110, and the third portion 112 with the initial data model of the virtual worksite 100. The comparison may include, among other parameters, comparison between a current surface profile as per the updated height map at the first, second, and third portions 108, 110, 112 and the initial surface profile as per the initial height map.

The central controller 302 is further configured to generate an updated data model of the virtual worksite 100 based on the comparison. In an example, the updated data model may represent a real time situation of the virtual worksite 100. The updated data model may also include data such as, but not limited to, updated routing instructions, an updated navigation data, an updated perception data, operational parameters, work cycles etc. for the one or more construction machines 102, 104, 106.

In an example, the central controller 302 may receive, from each of the number of simulated construction machine controllers 128, 130, 132, the number of updated height maps corresponding to the number of portions 108, 110, 112 of the virtual worksite 100. Further, the central controller 302 merges the number of updated height maps corresponding to the number of portions 108, 110, 112 of the virtual worksite 100 with the initial height map of the virtual worksite 100. Moreover, the central controller 302 may generate the updated height map of the virtual worksite 100 based on the merging of the number of updated height maps. The updated height map of the virtual worksite 100 may be then used to update the initial data model of the virtual worksite 100.

In another example, for the particular portion 108, 110, 112 of the virtual worksite 100, the central controller 302 may superimpose the initial surface profiles from the initial height maps and current surface profiles from the updated height maps to generate the updated data model. For example, a planar surface at the virtual worksite 100 may appear as a hole after a digging operation by one or more construction machines 102, 104, 106. The initial height map may show the particular portion 108, 110, 112 of the virtual worksite 100 as the planar surface and the updated height map may show the particular portion 108, 110, 112 of the virtual worksite 100 as the hole. Thus, the central controller 302 may determine based on the comparison that the surface profile of the virtual worksite 100 has changed and may update the initial data model accordingly. It should be understood that the example discussed herein is only one of multiple instances that may be addressed by the central controller 302. The central controller 302 may perform such comparison exercises for each portion 108, 110, 112 of the virtual worksite 100 and may generate the updated data model accordingly.

Further, in an example, the simulated construction machine controllers 128, 130, 132 may determine a deformation value at the one or more portions 108, 110, 112 of the virtual worksite 100 based on the updated height map. The deformation value may quantitatively represent the changes made to the one or more portions 108, 110, 112 of the virtual worksite 100 based on the interaction between the construction machines 102, 104, 106 and the one or more portions 108, 110, 112, respectively. Further, the simulated construction machine controllers 128, 130, 132 may determine a force feedback value based on an interaction between the number of construction machines 102, 104, 106 and the one or more portions 108, 110, 112 of the virtual worksite 100. Additionally, the simulated construction machine controllers 128, 130, 132 may transmit the force feedback value to the one or more simulated construction machine controllers 128, 130, 132 from the number of simulated construction machine controllers 128, 130, 132. The information pertaining to the force feedback value may be used to adjust operational parameters for the one or more construction machines 102, 104, 106. In an example, the deformation value and the force feedback value may provide correlation between a force required to affect a certain value of deformation at the corresponding portions 108, 110, 112 of the virtual worksite 100. Moreover, the force feedback value and the deformation value determined by the simulated construction machine controllers 128, 130, 132 may be used by other construction machines 102, 104, 106, when such construction machines 102, 104, 106 may operate on that particular portion 108, 110, 112 of the virtual worksite 100 either simultaneously or at a later stage in time.

Further, the central controller 302 transmits, to each of the number of simulated construction machine controllers 128, 130, 132 and/or a user interface 308, the updated data model of the virtual worksite 100. In an example, the central controller 302 transmits, to the simulated construction machine controller 128, 130, 132 of one or more construction machine 102, 104, 106 from the number of construction machines 102, 104, 106, the updated data model corresponding to the particular portion 108, 110, 112 of the virtual worksite 100 on which the one or more construction machine 102, 104, 106 is operating. For example, the central controller 302 may transmit the updated data model corresponding to the first portion 108 to the first simulated construction machine controller 128, the updated data model corresponding to the second portion 110 to the second simulated construction machine controller 130, and the updated data model corresponding to the third portion 112 to the third simulated construction machine controller 132.

Moreover, the central controller 302 may transmit the updated data model corresponding to the first portion 108 to the second simulated construction machine controller 130 or the third simulated construction machine controller 132, the updated data model corresponding to the second portion 110 to the first simulated construction machine controller 128 or the third simulated construction machine controller 132, and the updated data model corresponding to the third portion 112 to the first simulated construction machine controller 128 or the second simulated construction machine controller 130. In an example, the central controller 302 may transmit the updated data model of the virtual worksite 100 to the corresponding simulated construction machine controllers 128, 130, 132 via the construction machine control module 306. In another example, the central controller 302 may directly transmit the updated data model of the virtual worksite 100 to each simulated construction machine controller 128, 130, 132.

Further, the user interface 308 may include any suitable input/output device that may provide a visual aid for monitoring a real time situation at the virtual worksite 100. The user interface 308 may be a touch screen device. The user interface 308 may include a display screen. The user interface 308 may embody a handheld device, such as a smartphone, a tablet, and the like. Further, the user interface 308 may embody a laptop, a desktop, and the like. The user interface 308 displays a real time image of the virtual worksite 100 thereon. In an example, as the central controller 302 updates the virtual worksite 100 in real time, the user interface 308 may display the images of the virtual worksite 100 as a movie file when the number of construction machines 102, 104, 106 are performing various operations for example, dozing, loading etc. on the virtual worksite 100. The user interface 308 may display a video illustrating the real time deformation of the virtual worksite 100 by the construction machines 102, 104, 106.

The central controller 302 may transmit, to the one or more simulated construction machine controllers 128, 130, 132 from the number of simulated construction machine controllers 128, 130, 132, the updated navigation data for one or more construction machines 102, 104, 106 from the number of construction machines 102, 104, 106. In an example, the updated navigation data may include data corresponding to the current location and/or current orientation of various construction machines 102, 104, 106 at the virtual worksite 100. In an example, the central controller 302 may transmit the updated navigation data of the virtual worksite 100 to each of the number of simulated construction machine controllers 128, 130, 132. Alternatively, the central controller 302 may transmit the updated navigation data for only the particular portion 108, 110, 112 of the virtual worksite 100 on which the corresponding construction machine 102, 104, 106 is operating. In an example, the central controller 302 may transmit the updated navigation data and the updated data model to the navigation simulation sensor module 202. The updated navigation data and the updated data model may allow the navigation simulation sensor module 202 to generate efficient and accurate navigation data for the one or more construction machines 102, 104, 106.

The central controller 302 may transmit, to the one or more simulated construction machine controllers 128, 130, 132 from the number of simulated construction machine controllers 128, 130, 132, the updated perception data for the one or more construction machines 102, 104, 106 from the number of construction machines 102, 104, 106. In an example, the updated perception data may include data corresponding to positioning of various objects or personnel present at the virtual worksite 100. In an example, the central controller 302 may transmit the updated perception data of the virtual worksite 100 to each of the number of simulated construction machine controllers 128, 130, 132. Alternatively, the central controller 302 may transmit the updated perception data for only the particular portion 108, 110, 112 of the virtual worksite 100 on which the corresponding construction machine 102, 104, 106 is operating. In an example, the central controller 302 may transmit the updated perception data and the updated data model to a perception simulation sensor module 312. The updated perception data and the updated data model may allow the perception simulation sensor module 312 to generate efficient and accurate perception data for the one or more construction machines 102, 104, 106. In some examples, when two or more construction machines 102, 104, 106 operate in close proximity to each other at the virtual worksite 100, the updated perception and navigation data pertaining to other construction machines 102, 104, 106 may assist the simulated construction machine controllers 128, 130, 132 to operate the corresponding construction machine 102, 104, 106 in an efficient manner.

Figure 4:
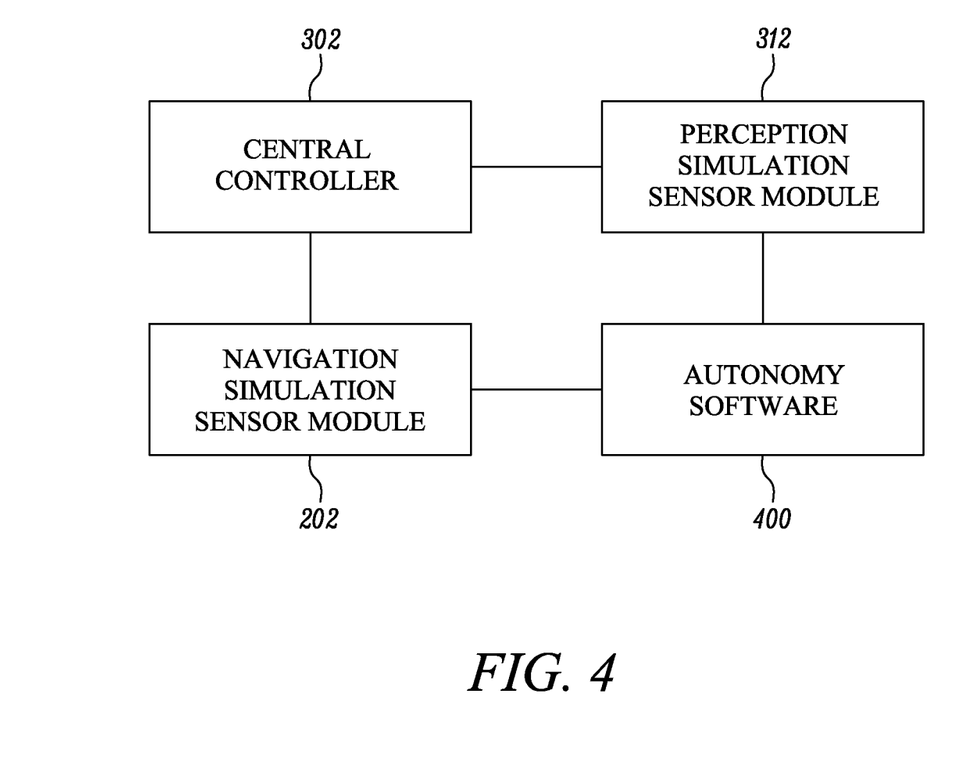
FIG. 4 illustrates a block diagram for testing an autonomy software, according to examples of the present disclosure.

FIG. 4 illustrates a block diagram for explaining a testing of an autonomy software 400. In the illustrated example of FIG. 4, the autonomy software is shown to be associated with the first construction machine 102 (see FIG. 1). However, it should be noted that the second and third construction machines 104, 106 (see FIG. 1) may also include a similar autonomy software (not shown). The autonomy software 400 may enable autonomous working of the construction machine 102. In an example, the updated data model, and more specifically, the updated height map of the first portion 108 or the entire virtual worksite 100, the updated perception data, and the updated navigation data generated by the central controller 302 may be used to test the autonomy software 400. The autonomy software 400 may receive inputs from one or more simulation modules associated with the construction machine 102. The simulation modules may include, for example, the navigation simulation sensor module 202 and the perception simulation sensor module 312.

Further, the updated perception data may be used to detect objects or personnel in close vicinity to the construction machine 102 for collision prevention. The perception simulation sensor module 312 may receive inputs from one or more sensors, such as, an accelerometer, a gyroscope, a speed sensor, a camera or any other device which may provide a visual input, a collision sensor etc. It should be noted that the examples provided herein are merely exemplary and the perception simulation sensor module 312 may include other type of sensors, as per application requirements. Thus, the perception simulation sensor module 312 may include the updated perception data corresponding to a three-dimensional environment around the construction machine 102. Further, the perception simulation sensor module 312 may receive the updated perception data from the central controller 302. The perception simulation sensor module 312 may transmit the updated perception data to the autonomy software 400. Furthermore, the updated perception data received from the perception simulation sensor module 312 may be used to test the autonomy software 400.

The navigation simulation sensor module 202 may receive inputs from one or more navigation sensors, such as, a GPS module, an IMU, a compass, a gyroscope, a level sensor, or any other sensor which may aid in providing inputs regarding the orientation and/or positioning of the construction machines 102, 104, 106, as well as various components of the corresponding construction machines 102, 104, 106, and/or other navigation data. It should be understood that the examples provided herein are merely exemplary and the navigation simulation sensor module 202 may include other type of sensors, as per application requirements. Further, the navigation simulation sensor module 202 may include the updated navigation data corresponding to the current location and/or orientation of the construction machine 102 and updated height maps of the first portion 108 or the virtual worksite which may be used for planning one or more operations and/or a navigation-path for the construction machine 102. Further, the navigation simulation sensor module 202 may receive the updated navigation data from the central controller 302 or from the worksite simulation module 220 (see FIG. 2). The navigation simulation sensor module 202 may transmit the updated navigation data to the autonomy software 400. Furthermore, the updated navigation data received from the navigation simulation sensor module 202 may be used to test the autonomy software 400. It should be further noted that the autonomy software associated with the second and third construction machines 104, 106 may also be tested in a manner similar to that explained above.

INDUSTRIAL APPLICABILITY

Figure 5:
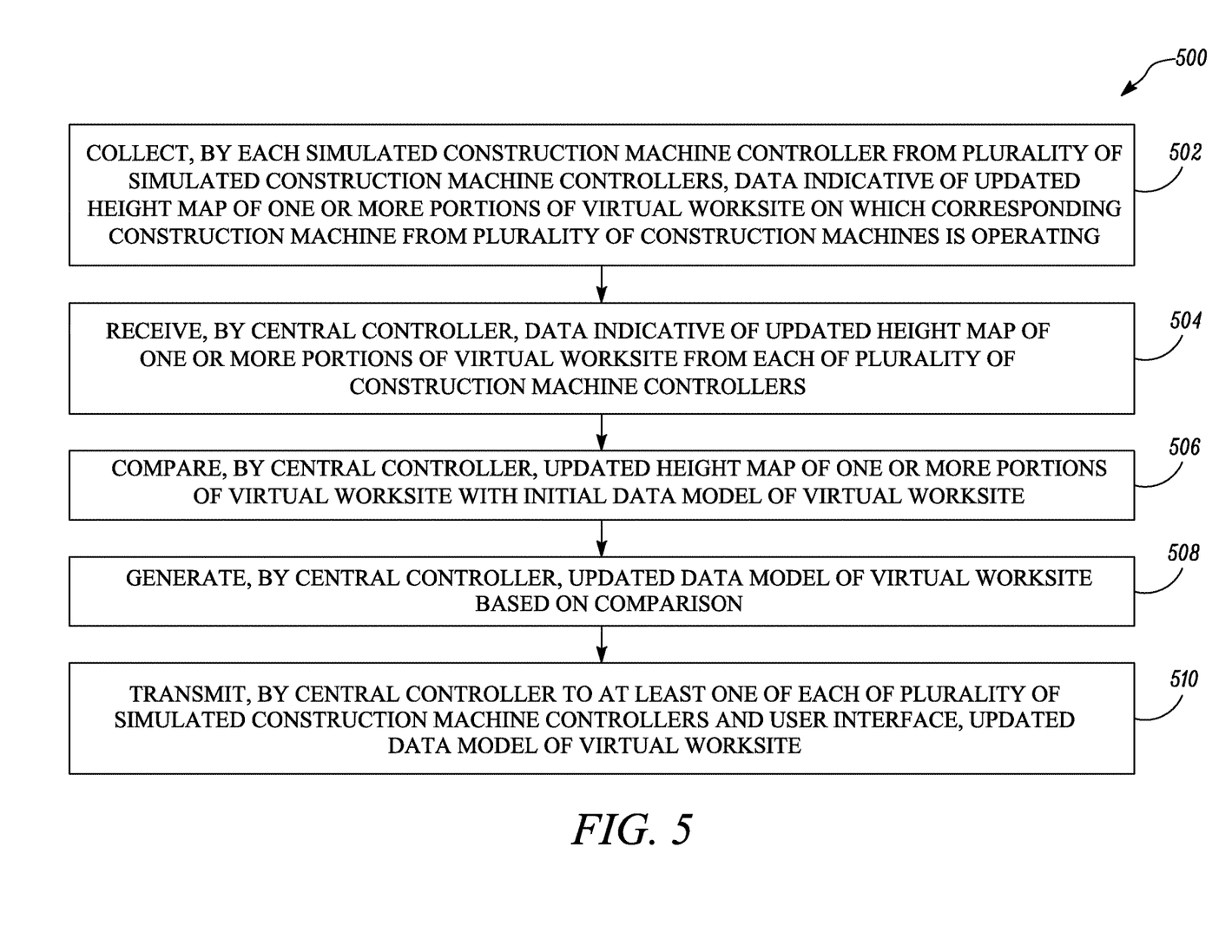
FIG. 5 illustrates a flowchart for a method of updating the virtual worksite, according to examples of the present disclosure.

The present disclosure relates to the system 300 and a method 500 for updating the virtual worksite 100 on which the number of construction machines 102, 104, 106 operate. The system 300 and the method 500 update the virtual worksite 100 in real time and also transmits updated information to the multiple construction machines 102, 104, 106, the navigation simulation sensor module 202, and the perception simulation sensor module 312. Accordingly, deformations occurring at different portions 108, 110, 112 of the virtual worksite 100 may be communicated to other construction machines 102, 104, 106 in real time. Moreover, the user interface 308 may allow a personnel to view the deformations occurring at the virtual worksite 100 in real time. Additionally, the present disclosure may provide a cost effective and time effective technique for testing the performance of the number of construction machines 102, 104, 106 in a virtual environment. Further, the system 300 and the method 500 may also allow efficient validation of the autonomy software, such as the autonomy software 400 associated with the first construction machine 102, in various complex test scenarios. Moreover, the system 300 and the method 500 may also allow effective and efficient utilization of the components associated with the construction machines 102, 104, 106. Additionally, the system 300 and the method 500 may be used by customers at project planning stages to estimate resource requirements.

An exemplary scenario may be envisioned as a construction of a school having an administrative building, a classroom building, and a playground with multiple roads connecting the administrative building, the classroom building, and the playground. As per the present disclosure, the central controller 302 may have initial data model of a worksite where the school is to be constructed as well as available resources in terms of a total number and types of construction machines. Through the teachings of the present disclosure, the construction of the school may be envisioned in a virtual manner. Through such knowledge beforehand, tweaks may be made to alter project completion timelines, material supply, utilization of resources, which may lead to increase in productivity at the worksite while reducing an overall cost.

Another exemplary scenario may include a construction of a highway. For example, during the construction of the highway, material may have to be removed from a terrain to achieve a levelled surface, some material may have to be moved to another location, and the like. Based on the teachings of the present disclosure, the central controller 302 may virtually envision a number of operations that may have to be performed for the construction of the highway. Through such knowledge beforehand, it may be possible to effectively manage resources, such as, construction machines and/or manpower to efficiently construct the highway. More such examples may be contemplated well within the scope of the present disclosure.

FIG. 5 illustrates the method 500 for updating the virtual worksite 100. The number of construction machines 102, 104, 106 operate on the one or more portions 108, 110, 112 defined by the virtual worksite 100. At step 502, each simulated construction machine controller 128, 130, 132 from the number of simulated construction machine controllers 128, 130, 132 collects data indicative of the updated height map of the one or more portions 108, 110, 112 of the virtual worksite 100 on which the corresponding construction machine 102, 104, 106 from the number of construction machines 102, 104, 106 is operating.

In an example, each of the number of simulated construction machine controllers 128, 130, 132 associated with the corresponding construction machine 102, 104, 106 from the number of construction machines 102, 104, 106 may collect the data indicative of the one or more interaction points between one or more components of the corresponding construction machine 102, 104, 106 and the one or more portions 108, 110, 112 of the virtual worksite 100 on which the corresponding construction machine 102, 104, 106 is operating. Further, each of the number of simulated construction machine controllers 128, 130, 132 may use the collected data to generate the updated height map of the one or more portions 108, 110, 112 of the virtual worksite 100 on which the corresponding construction machine 102, 104, 106 is operating.

At step 504, the central controller 302 receives the data indicative of the updated height map of the one or more portions 108, 110, 112 of the virtual worksite 100 from each of the number of simulated construction machine controllers 128, 130, 132. At step 506, the central controller 302 compares the updated height map of the one or more portions 108, 110, 112 of the virtual worksite 100 with the initial data model of the virtual worksite 100.

The initial data model of the virtual worksite 100 includes the initial height map of the virtual worksite 100, the initial position data for each of the number of construction machines 102, 104, 106, the initial orientation data for each of the number of construction machines 102, 104, 106, the initial navigation data for each of the number of construction machines 102, 104, 106, or the initial perception data for each of the number of construction machines 102, 104, 106.

At step 508, the central controller 302 generates the updated data model of the virtual worksite 100 based on the comparison. In an example, the central controller 302 receives the number of updated height maps corresponding to the number of portions 108, 110, 112 of the virtual worksite 100 from each of the number of simulated construction machine controllers 128, 130, 132. Further, the central controller 302 merges the number of updated height maps corresponding to the number of portions 108, 110, 112 of the virtual worksite 100 with the initial height map of the virtual worksite 100. Moreover, the central controller 302 generates the updated height map of the virtual worksite 100 based on the merging of the number of updated height maps. The central controller 302 may use the updated height map to further modify the updated data model.

Further, the central controller 302 may receive the current position data for each of the number of construction machines 102, 104, 106, the current orientation data for each of the number of construction machines 102, 104, 106, the current navigation data for each of the number of construction machines 102, 104, 106, or the current perception data for each of the number of construction machines 102, 104, 106 for generating the updated data model.

At step 510, the central controller 302 transmits the updated data model of the virtual worksite 100 to each of the number of simulated construction machine controllers 128, 130, 132 and/or the user interface 308. The user interface 308 displays the real time image of the virtual worksite 100 thereon.

In an example, the central controller 302 transmits the updated data model corresponding to the particular portion 108, 110, 112 of the virtual worksite 100 to the simulated construction machine controller 128, 130, 132 of the one or more construction machines 102, 104, 106 from the number of construction machines 102, 104, 106 on which the one or more construction machines 102, 104, 106 is operating.

In an example, the simulated construction machine controllers 128, 130, 132 may determine the deformation value at the one or more portions 108, 110, 112 of the virtual worksite 100 based on the updated height map. Further, the simulated construction machine controllers 128, 130, 132 may determine the force feedback value based on the interaction between the number of construction machines 102, 104, 106 and the one or more portions 108, 110, 112 of the virtual worksite 100. Moreover, the simulated construction machine controllers 128, 130, 132 may transmit the force feedback value to the one or more simulated construction machine controllers 128, 130, 132 from the number of simulated construction machine controllers 128, 130, 132.

In an example, the central controller 302 transmits the updated navigation data for the one or more construction machines 102, 104, 106 from the number of construction machines 102, 104, 106 to the one or more simulated construction machine controllers 128, 130, 32 from the number of simulated construction machine controllers 128, 130, 132. In another example, the central controller 302 transmits the updated perception data for the one or more construction machines 102, 104, 106 from the number of construction machines 102, 104, 106 to the one or more simulated construction machine controllers 128, 130, 132 from the number simulated construction machine controllers 128, 130, 132.

While aspects of the present disclosure have been particularly shown and described with reference to the embodiments above, it will be understood by those skilled in the art that various additional embodiments may be contemplated by the modification of the disclosed construction machines, systems, and methods without departing from the spirit and scope of what is disclosed. Such embodiments should be understood to fall within the scope of the present disclosure as determined based upon the claims and any equivalents thereof.

The invention claimed is:

1. A system for updating a virtual worksite, wherein a plurality of construction machines operate on one or more portions defined by the virtual worksite, the system comprising:
   a plurality of simulated construction machine controllers, wherein each simulated construction machine controller from the plurality of simulated construction machine controllers is associated with a corresponding construction machine from the plurality of construction machines, and wherein each simulated construction machine controller is configured to collect data indicative of an updated height map of the one or more portions of the virtual worksite on which the corresponding construction machine is operating; and
   a central controller communicably coupled to each of the plurality of simulated construction machine controllers, wherein the central controller is configured to:
      receive the data indicative of the updated height map of the one or more portions of the virtual worksite from each of the plurality of simulated construction machine controllers;
      compare the updated height map of the one or more portions of the virtual worksite with an initial data model of the virtual worksite;
      generate an updated data model of the virtual worksite based on the comparison; and
      transmit, to at least one of each of the plurality of simulated construction machine controllers and a user interface, the updated data model of the virtual worksite, wherein the user interface is configured to display a real time streaming of data of the virtual worksite thereon.

2. The system of claim 1, wherein the central controller is further configured to:
   transmit, to the simulated construction machine controller of at least one construction machine from the plurality of construction machines, the updated data model corresponding to a particular portion of the virtual worksite on which the at least one construction machine is operating.

3. The system of claim 1, wherein each of the plurality of simulated construction machine controllers associated with a corresponding construction machine from the plurality of construction machines is further configured to:
collect data indicative of one or more interaction points between one or more components of the corresponding construction machine and the one or more portions of the virtual worksite on which the corresponding construction machine is operating; and
use the collected data to generate the updated height map of the one or more portions of the virtual worksite on which the corresponding construction machine is operating.

4. The system of claim 1, wherein the simulated construction machine controller is further configured to:
determine a deformation value at the one or more portions of the virtual worksite based on the updated height map.

5. The system of claim 1, wherein the simulated construction machine controller is further configured to:
determine a force feedback value based on an interaction between the plurality of construction machines and the one or more portions of the virtual worksite; and
transmit the force feedback value to at least one simulated construction machine controller from the plurality of simulated construction machine controllers.

6. The system of claim 1, wherein the central controller is further configured to:
transmit, to at least one simulated construction machine controller from the plurality of simulated construction machine controllers, an updated navigation data for at least one construction machine from the plurality of construction machines.

7. The system of claim 1, wherein the central controller is further configured to:
transmit, to at least one simulated construction machine controller from the plurality of simulated construction machine controllers, an updated perception data for at least one construction machine from the plurality of construction machines.

8. The system of claim 1, wherein the central controller is further configured to:
receive, from each of the plurality of simulated construction machine controllers, a plurality of updated height maps corresponding to a plurality of portions of the virtual worksite;
merge the plurality of updated height maps corresponding to the plurality of portions of the virtual worksite with an initial height map of the virtual worksite; and
generate an updated height map of the virtual worksite based on the merging of the plurality of updated height maps.

9. The system of claim 1, wherein the initial data model of the virtual worksite includes at least one of an initial height map of the virtual worksite, an initial position data for each of the plurality of construction machines, an initial orientation data for each of the plurality of construction machines, an initial navigation data for each of the plurality of construction machines, and an initial perception data for each of the plurality of construction machines.

10. The system of claim 1, wherein the central controller is further configured to receive at least one of a current position data for each of the plurality of construction machines, a current orientation data for each of the plurality of construction machines, a current navigation data for each of the plurality of construction machines, and a current perception data for each of the plurality of construction machines for generating the updated data model.

11. A method for updating a virtual worksite, wherein a plurality of construction machines operate on one or more portions defined by the virtual worksite, the method comprising:
collecting, by each simulated construction machine controller from a plurality of simulated construction machine controllers, data indicative of an updated height map of the one or more portions of the virtual worksite on which a corresponding construction machine from the plurality of construction machines is operating;
receiving, by a central controller, the data indicative of the updated height map of the one or more portions of the virtual worksite from each of the plurality of simulated construction machine controllers;
comparing, by the central controller, the updated height map of the one or more portions of the virtual worksite with an initial data model of the virtual worksite;
generating, by the central controller, an updated data model of the virtual worksite based on the comparison; and
transmitting, by the central controller to at least one of each of the plurality of simulated construction machine controllers and a user interface, the updated data model of the virtual worksite, wherein the user interface is configured to display a real time streaming of data of the virtual worksite thereon.

12. The method of claim 11 further comprising:
transmitting, by the central controller to the simulated construction machine controller of at least one construction machine from the plurality of construction machines, the updated data model corresponding to a particular portion of the virtual worksite on which the at least one construction machine is operating.

13. The method of claim 11, further comprising:
collecting, by each of the plurality of simulated construction machine controllers associated with a corresponding construction machine from the plurality of construction machines, data indicative of one or more interaction points between one or more components of the corresponding construction machine and the one or more portions of the virtual worksite on which the corresponding construction machine is operating; and
using, by each of the plurality of simulated construction machine controllers, the collected data to generate the updated height map of the one or more portions of the virtual worksite on which the corresponding construction machine is operating.

14. The method of claim 11, further comprising:
determining, by the simulated construction machine controller, a deformation value at the one or more portions of the virtual worksite based on the updated height map.

15. The method of claim 11, further comprising:
determining, by the simulated construction machine controller, a force feedback value based on an interaction between the plurality of construction machines and the one or more portions of the virtual worksite; and
transmitting, by the simulated construction machine controller, the force feedback value to at least one simulated construction machine controller from the plurality of simulated construction machine controllers.

16. The method of claim 11, further comprising:
transmitting, by the central controller, an updated navigation data for at least one construction machine from the plurality of construction machines to at least one simulated construction machine controller from the plurality of simulated construction machine controllers.

17. The method of claim 11, further comprising:
transmitting, by the central controller, an updated perception data for at least one construction machine from the plurality of construction machines to at least one simulated construction machine controller from the plurality of simulated construction machine controllers.

18. The method of claim 11, further comprising:
receiving, by the central controller, a plurality of updated height maps corresponding to a plurality of portions of the virtual worksite from each of the plurality of simulated construction machine controllers;
merging, by the central controller, the plurality of updated height maps corresponding to the plurality of portions of the virtual worksite with an initial height map of the virtual worksite; and
generating, by the central controller, an updated height map of the virtual worksite based on the merging of the plurality of updated height maps.

19. The method of claim 11, wherein the initial data model of the virtual worksite includes at least one of an initial height map of the one or more portions of the virtual worksite, an initial position data for each of the plurality of construction machines, an initial orientation data for each of the plurality of construction machines, an initial navigation data for each of the plurality of construction machines, and an initial perception data for each of the plurality of construction machines.

20. The method of claim 11, further comprising:
receiving, by the central controller, at least one of a current position data for each of the plurality of construction machines, a current orientation data for each of the plurality of construction machines, a current navigation data for each of the plurality of construction machines, and a current perception data for each of the plurality of construction machines for generating the updated data model.

* * * * *